United States Patent [19]

Yeh

[11] Patent Number: 4,931,247

[45] Date of Patent: Jun. 5, 1990

[54] FABRICATION METHOD OF A HOLLOW RACKET MADE OF CARBON FIBER

[76] Inventor: Chien-Hwa Yeh, 4th Floor, 52, Chung-Cheng 3rd Road, Kaohsiung, Taiwan

[21] Appl. No.: 286,263

[22] Filed: Dec. 19, 1988

[51] Int. Cl.[5] .................. B29C 43/10; B29C 43/20
[52] U.S. Cl. .................. 264/258; 264/314; 264/250; 273/73 F
[58] Field of Search ............ 264/317, 258, 314, 250; 273/73 F

[56] References Cited

U.S. PATENT DOCUMENTS

| | | | |
|---|---|---|---|
| 3,993,308 | 11/1976 | Jenks | 264/258 |
| 4,031,181 | 6/1977 | Schaefer | 264/258 |
| 4,124,670 | 11/1978 | Cecka | 264/259 |
| 4,264,389 | 4/1981 | Staub | 264/258 |
| 4,294,787 | 10/1981 | Lo | 264/257 |
| 4,361,533 | 11/1982 | Jenks | 264/258 |
| 4,393,024 | 7/1983 | You | 264/257 |
| 4,429,873 | 2/1984 | Van Raemdonck | 264/257 |
| 4,511,523 | 4/1985 | Hsu | 264/257 |

Primary Examiner—Jay H. Woo
Assistant Examiner—Jeremiah F. Durkin, II
Attorney, Agent, or Firm—Nixon & Vanderhye

[57] ABSTRACT

The present invention relates to a method of fabricating a hollow recreational product, such as a racket, made of fibre or carbon fibre by providing a fibre sleeve tube mounted onto a racket filament mold and having several layers of overlapped woven boards wrapped about the entire filament mold. Several layers of woven boards of a shorter length are wrapped about the head of the filament mold. A fibre sleeve tube is disposed about the layers and the end of the head is sealed with a fibre cloth. The racket is then removed from the filament mold. An air blowing sleeve tube is placed into the opening of the tail of the embryonic mold of the racket and an air blowing nozzle is installed at the opening end of the air blowing sleeve tube. The assembly is placed into a die, air is blown into the embryonic mold and the mold is heated, so as to have the embryonic mold hardened and formed. Upon removal of the racket from the die and removal of the air blowing nozzle, a special adhesive agent is supplied through the tail hole. The tail hole is then sealed with resin and the mold is heated for a second time. After having the semi-product taken from the die, a small hole is drilled in the racket and the racket is coated. After the semi-product has been coated and dried, air inside the racket is expelled through the small hole and the small hole is sealed with resin.

4 Claims, 3 Drawing Sheets

FABRICATION METHOD OF A HOLLOW RACKET MADE OF CARBON FIBER

BACKGROUND AND SUMMARY OF THE INVENTION

The present invention relates to a method of fabricating a hollow recreational product, such as a racket or bat, the product being formed of glass fibre or carbon fibre or other fibre materials.

It is commonly known that conventional rackets or bats are usually made of solid wood. Later hollow aluminum racket bodies were developed because wooden products were more easily deformed, cracked and rather poor in applying impact forces. Later fibre materials were used for the fabrication of these products. However, in adopting fibre materials for the fabrication of such products, the weight of the products should correspond with a specific standard and the products thus made should also have considerable force of intensity to withstand the impact force produced at the time of hitting. Although the technology of using fibre or carbon fibre materials to make various rackets, bats, fishing rods or golf rods are very progressive, the designs in making various products still have to correspond to the requirements of each specific force of intensity and elasticity. Therefore, the fabrication process, design, etc., of various products cannot be interchangeable. Each design can only be applied for the design of individual models. As a great impact force will be produced at the head of the body of the product at the time of hitting, the hardness and the force of intensity of the body itself are extremely important. The present technique can only fabricate solid products of which their force of intensity is able to correspond to the required standard by means of having the interior of the rackets filled with polyurethane (PU) foaming body and their exterior layer wrapped up with fibre board. Such products will let the player enjoy a pleasant feeling at the time of playing. However, as its foaming filament body occupied a part of the weight of the racket, the thickness of its fibre layer had to be reduced to control the fixed weight of the racket and thus weakened its ability to apply a force of substantial magnitude. In view of these defects, a method of fabrication different from that of conventional products of this type is employed while using fibre or carbon fibre or any other fibre materials suitable for fabricating such products, so as to cater to the habit of the players.

The present invention relates to a method of fabricating hollow recreational products, such as a racket or bat made of fibre or carbon fibre or any fibre materials suitable for the said fabrication.

Fibre materials have long been adopted for the fabrication of various sporting goods, such as bats, rackets, fishing rods, golf rods, etc., to make a product which is higher in quality, lighter in weight and stronger. Usually, fibre materials are applied over a PU foaming body. However, products of this type have been found unable to cater to the habits of players and are not sufficiently strong. Previously, ordinary sporting goods products for contest purpose have usually been made of solid wood. However, they are found to be easily deformed and cracked. Moreover, it is also rather difficult to obtain wood materials which are high in quality. Consequently, their cost becomes high. Aluminum hollow rackets have recently been developed and are lighter in weight and stronger. Aluminum recreational products, such as bats, are particularly valued for producing a clear and crisp sound at the time of hitting to allow the players to enjoy a pleasant feeling, especially when a four-bagger is being scored. Because of this, many players favor aluminum bats. However, after the bats have been used for many times, the surface of the heads of such aluminum bats will become concaved or pitted as a result of the strong impact forces when hitting. Thus, bats have to be made in such a way that their hardness is rather high. Therefore, the vibrations produced in the bat at the instant the ball is hit will be directly conducted to the arm of the player. The magnitude of the vibrations will depend on the speed at which the pitcher throws the ball and the strength which is produced by the arm of the pitcher. Over time, the vibrations will cause damage to and eventually ruin the health of the player. A bat made of fibre materials has been successfully developed as a solution to this problem. As the interior of this fibre bat is filled with PU foaming agent, the body of the racket is provided with excellent elasticity and anti-bending intensity to the effect that no cracking will be occurred and a part of the vibration, produced at the time of hitting, will be absorbed by the racket, so that no serious sporting damage will be caused. However, the structure of this kind of fibre bat typically includes a large diameter at its head and a handle extended therefrom having a circular tube of a smaller diameter. A great difference will also be found in the degree of curve at their juncture. Its present fabrication method provides several layers of straight-striped fibre woven board directly rolled and wrapped up on the filament mold of the foaming agent of the bat body. The fibre layers on the joining part of the handle and the head of the bat are likely to be concaved after repeated hitting. Cracking will usually occur on the joining part of the bat due to the fact that such joining part will form a concentrated point of stress caused by poor conduction of the vibration force of the fibre layers as a result of their being cracked and folded. It becomes the main factor which leads to the cracking of the bat. On the other hand, as the bat is a solid one made of PU foaming material, it is impossible to produce a clear and crisp sound at the time of hitting. This makes the players rather unwilling to use it in their ball games. Therefore, it is quite impossible for the manufacturers to make a hollow bat due to the problems caused by the forementioned defects.

In view of the continual occurrence of these defects found in conventional bats, the inventor managed to successfully develop the rolling/covering method of fabrication first initiated by him, in which a hollow bat is made by having the mounting process of the fibre sleeve tube coupled with the mode of cutting of fibre woven board. In the process of fabrication, adhesive agents are filled into the bat body and the segments of the air blowing tube are adhered to the interior wall of the racket body, where the air is to be expelled at the time of heating, so as to prevent cracking from happening on the head or tail of the racket.

In a preferred embodiment according to the present invention, there is provided a method of fabricating a hollow recreational product having a head and formed of discrete layers of fiber material comprising the steps of providing a first fibre sleeve tube about an elongated tubular mold of the product, providing several discrete layers of overlapping fibre woven boards having lengths approximately equal to that of the length of the product, rolling the fibre woven boards about the fibre sleeve tube, providing a plurality of discrete layers of fibre woven boards shorter in length than the length of the product, rolling these short layers about the head of the product, mounting a second fibre sleeve tube about the outermost layer of rolled fibre Woven boards, sealing the head of the product with a fibre material, removing the mold from within the first tube to form a hollow product, inserting an air blowing tube into the hollow product, blowing air into the tube to pressurize the product, inserting the product into a die and heating the product within the die so as to harden and form a hollow product formed of fibre material.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Figure 1:
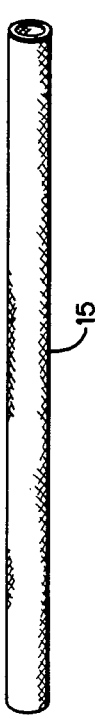
FIGS. 1 and 2 are perspective views of fibre sleeve tubes employed in forming the recreational product of the present invention.
Figure 2:
Figure 3:
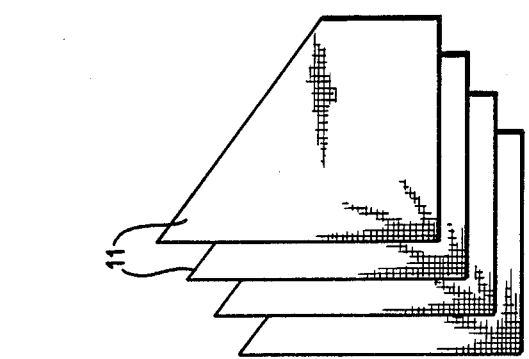
FIG. 3 is a plan view of overlapped fibre woven boards employed to wrap about the tube 15.
Figure 4:
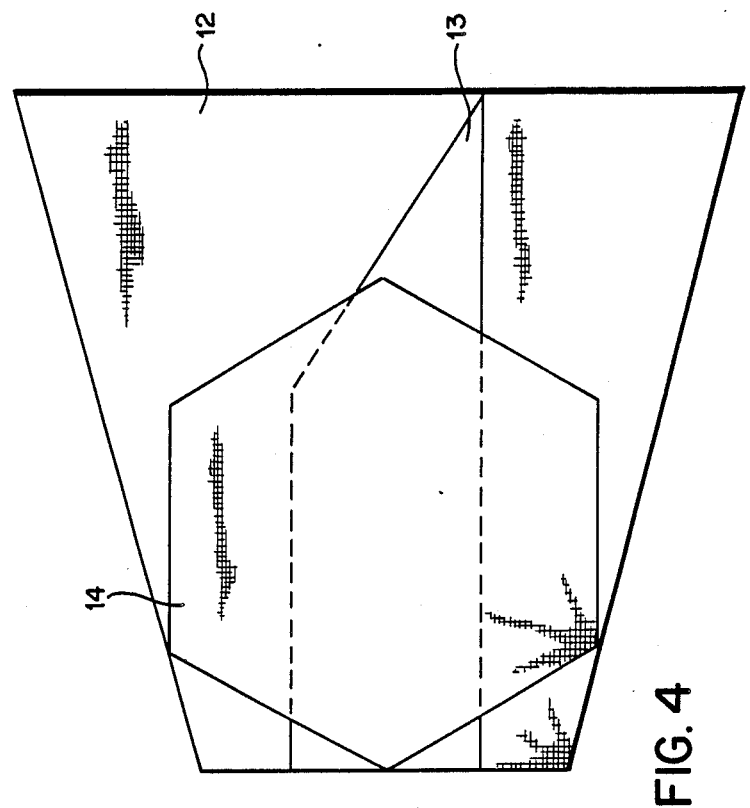
FIG. 4 is a view similar to FIG. 3 illustrating additional fibre boards for wrapping the entire length of the recreational product.

Reference will now be made in detail to the present preferred embodiment of the invention, an example of which is illustrated in the accompanying drawings.

It can be seen from the drawing figures that the fibre or carbon fibre woven boards used in the present invention are made of a singular fibre or carbon fibre or a mixture of other materials. For the purpose of easy explanation, all of the materials used will henceforth be referred to under the terminology of fibre material. The fibre woven boards 11, 12, 13 and 14 and the fibre sleeve tubes 15 and 16 are soaked in epoxy resin prior to using. The length of the fibre woven boards 11 is rather short and is approximately equivalent to the length of the head of the bat which has a comparatively larger diameter. The length of the fibre sleeve tubes 15, 16, however, should be comparatively longer than that of the entire bat.

Figure 7:
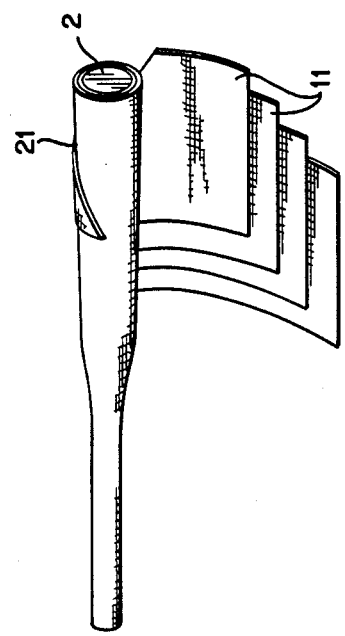
FIG. 7 is a view similar to FIG. 6 illustrating the wrapping of the product with the fibre boards illustrated in FIG. 3.
Figure 9:
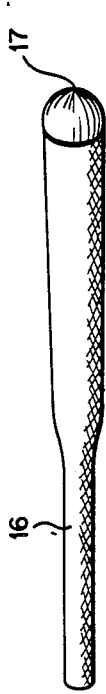
FIG. 9 is a perspective view of the outer sleeve tube wrapped about the wrapped product of FIG. 7.
Figure 5:
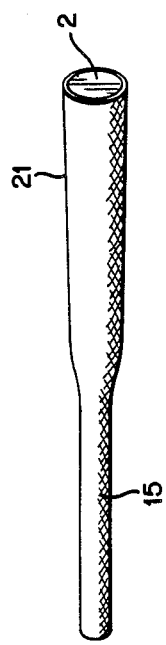
FIG. 5 is a perspective view of the inner fibre sleeve tube 15 mounted on a mold.
Figure 8:
FIG. 8 is a perspective view of the outer sleeve tube.
Figure 6:
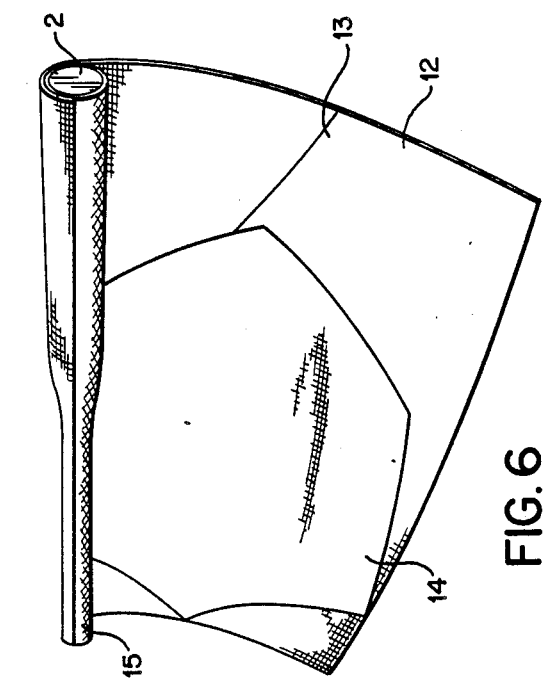
FIG. 6 is a perspective view illustrating the wrapping of the sleeve 15 by the boards illustrated in FIG. 4.
Figure 10:
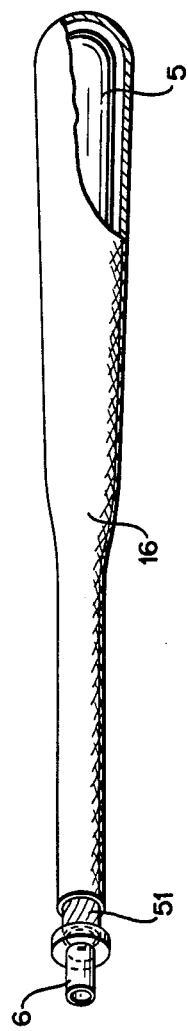
FIG. 10 is a view similar to FIG. 9 illustrating an air blowing tube within the product being formed.
Figure 11:
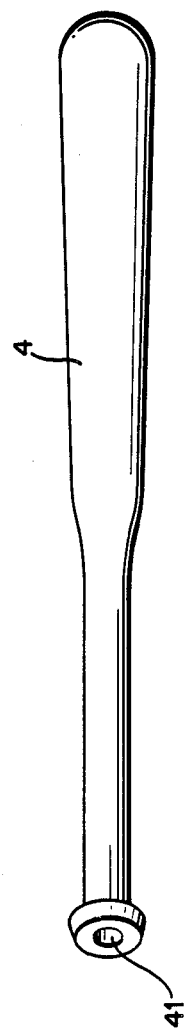
FIGS. 11 and 12 are views similar to FIG. 10 illustrating later stages of the fabrication method.

The major fabrication procedures of the present invention as indicated in FIG. 5 is to first provide a layer of fibre sleeve tube 15 mounted on a bat filament mold 2. Then, as indicated in FIG. 6, the piled up fibre woven boards 12, 13, 14 are rolled in partially overlapping relation onto the outer layer of the forementioned fibre sleeve tube 15. Then, as indicated in FIG. 7, several layers of piled up fibre woven boards 11 are rolled and coiled onto the head of the bat filament mold 21. The fibre sleeve tube 16 is then passed over the outer layers as indicated in FIGS. 8 and 9. Because the fibre sleeve tubes 15, 16 are formed by having the fibre filament interwoven, they have excellent elasticity. When tube 16 is being sleeved and mounted onto the head where there is a larger diameter, it will be naturally expanded and closely adhered to the underlying fibre layer on the interior wall. Then, the end plane of the head is sealed to form a convex edged end plane. Thereafter, the tube shaped body which is formed by coiling the forementioned several fibre layers is taken off the filament mold and thus forms the embryonic mold of a hollow bat 4 as indicated in FIG. 10. The next step is to insert an air blowing tube 5 through the tail hole 41 of the forementioned embryonic mold and install an air blowing nozzle at the tube opening 51 of the air blowing tube. The bat mold 4 on which the air blowing nozzle 6 has been installed can then be put in the die casing for air blowing/heating and hardening and forming processes. From the tail of the semi-finished product which has been taken out of the die casing, the air blowing nozzle is removed as is indicated in FIG. 11 and a tail hole 41 will still remain at the end plane of the tail of the bat. The air blowing tube is then removed from the interior of the bat through the tail hole 41 by means of a steel hooking device, not shown. Because the air blowing tube is made of plastic material, it will harden after it has been heated. Thus, it will be easily cracked into pieces and making it impossible to completely remove it by a hooking device. Under such circumstances, plastic segments are likely to be remained inside the hollow bat. Once the racket is formed, such plastic material will produce a queer sound inside the bat at the time of impact when playing. This will obviously affect the psychology of the player. In view of this effect, a special adhesive agent will be filled into the interior of the bat through the tail 41 at the end plane of the tail of the bat. The forementioned adhesive material should comprise a material which will not become hardened when it is being heated. When the inventor is conducting his experiment, 10% of toluene is added to polyisobutylene. After having them mixed together, its viscosity is approximately 1500 CPS and it will be raised to approximately 3000 CPS after heating and it will still be adhesive. Because of this special feature, the plastic segments of the air blowing tube still remaining inside the bat will then be adhered to the interior wall of the bat without producing any queer sound. Then, tail hole 41 is sealed at the tail end of the bat and the bat is for a second time passed through a heating/hardening process. This second process enables the fibre layers and the resin which has been patched on the tail hole 41 to be completely hardened and thus accomplish the forming of a hollow bat 7.

Figure 12:
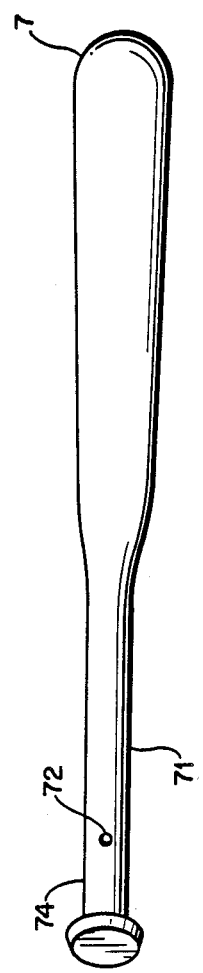

Secondly, prior to conducting the surface coating of the bat, a small hole is drilled at the holding part 74 close to the tail end of the racket as indicated in FIG. 12. Then, after the surface of the bat 7 is coated, it is put into a drying process. At this time, after the air inside the racket has been expanded by heating, it will be released through small hole 72. The forementioned small hole 71 will then be patched after the surface coating of the bat has been completely dried. In addition, the forementioned small hole 72 will not affect the outer appearance and the striking intensity of the bat because the holding part of the bat is usually wrapped up by fibre material to facilitate its holding by the hand of the player.

In the forementioned fabrication process, the reason why a small hole 72 has to be drilled prior to its surface coating and drying process is that the head and the end of the bat are being wrapped up by fibre material, that the racket itself is not integrally formed and that the tail hole 41 at the end plane of the bat is usually patched with resin, and consequently will weaken the force of intensity at the position where the joining part is sealed. If no air hole is installed when the surface coating is being dried, the pressure which is produced when the air inside the body of the bat is being expanded by heating, the air will then be expanded toward the tail hole at the tail end or the head of the racket. When such pressure builds up, cracking will be caused at the forementioned position. Consequently, the bat will become defective and useless.

As a solution to this problem, a special mode is adopted by the present invention to cut the fibre material which is being used for the fabrication of the bat. After the fibre material has been piled up, divided into sections and rolled into a tube shape, it will be so arranged that it will cope with the mounting process of the fibre sleeve tube to enable the fibre layers to coil along the curve of the outer surface of the bat to form a flat and smooth arc, so as to prevent the concaved phenomenon from happening. Moreover, an adhesive agent is also filled into the hollow body of the bat to the effect that the segments of the air blowing tube will then be adhered to the interior wall of the hollow body of the bat and thus prevent a queer sound from happening. A small hole has to be drilled on the holding part of the racket to prevent the head and two ends of the racket from cracking and becoming defective. The forementioned small hole can also be drilled at some other position. However, according to the opinion of the inventor, the best position on which the small hole is to be drilled will be the holding part of the bat.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed:

1. A method of fabricating a hollow recreational product having a head and formed of discrete layers of fiber material comprising the steps of:
    providing a epoxy resin impregnated first fibre sleeve tube about an elongated tubular mold of the product;
    providing several discrete layers of overlapping epoxy resin impregnated fibre woven boards having lengths approximately equal to that of the length of the product;
    rolling the fibre woven boards about said fibre sleeve tube;
    providing a plurality of discrete layers of epoxy resin impregnated fibre woven boards shorter in length than the length of the product;
    rolling these short layers about the head of the product;
    mounting a second epoxy resin impregnated fibre sleeve tube about the outermost layer of rolled fibre woven boards;
    sealing the head of the product with a fibre material;
    removing said mold from within the first tube to form a hollow product;
    inserting an air blowing tube into the hollow product;
    blowing air into the tube to pressurize the product;
    inserting the product into a die; and
    heating the product within the die so as to harden and form a hollow product formed of fibre material.

2. A method according to claim 1 including providing first and second tubes in lengths slightly longer than the length of the product.

3. A method according to claim 1 including, after having completed the steps of air blowing and heating, removing the air blowing tube from the inside of the product and then filling the hollow within the product with an adhesive agent and heating the product for a second time to adhere any residual portions of the air blowing within the inside of the product to the interior walls thereof.

4. A method according to claim 1 including, after having completed the steps of air blowing and heating and hardening, removing the air blowing tube from the inside of the product and then filling the hollow within the product with an adhesive agent and heating the product for a second time.

* * * * *